Sept. 28, 1965     T. TALLIAN ETAL     3,208,268
DETECTION OF ALMOST PERIODIC OCCURRENCES
Filed Oct. 5, 1961     3 Sheets-Sheet 1

INVENTORS:
TIBOR TALLIAN
JOSEPH A. KAMENSHINE
OLOF G. GUSTAFSSON
BY Howson & Howson
ATTYS.

Sept. 28, 1965   T. TALLIAN ETAL   3,208,268
DETECTION OF ALMOST PERIODIC OCCURRENCES
Filed Oct. 5, 1961   3 Sheets-Sheet 3
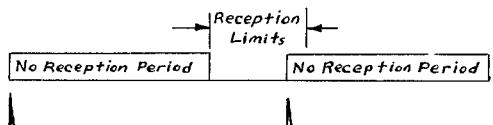
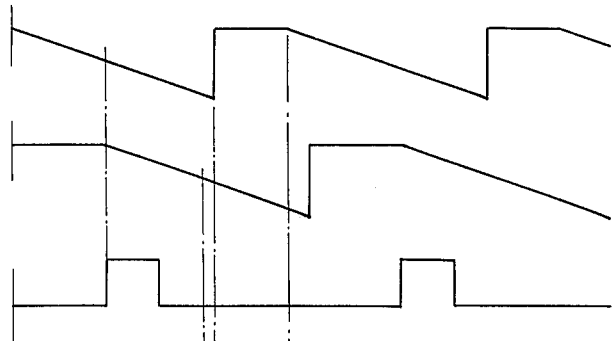
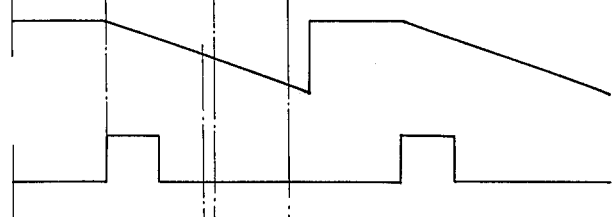
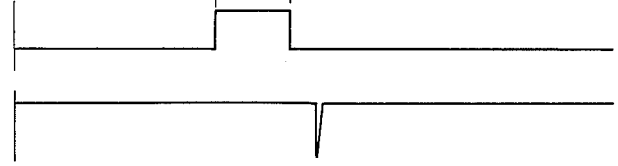
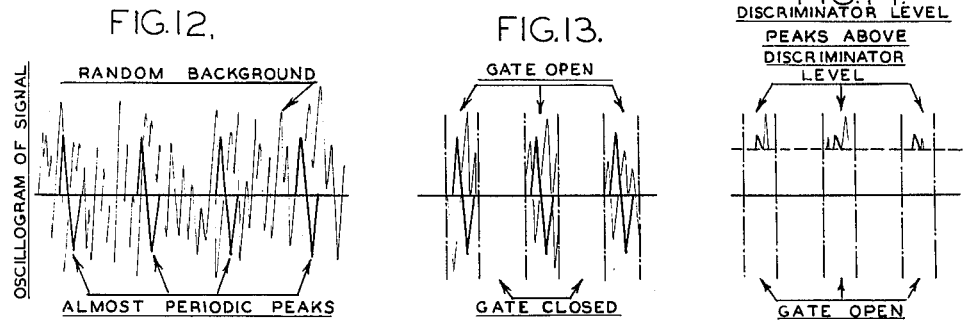
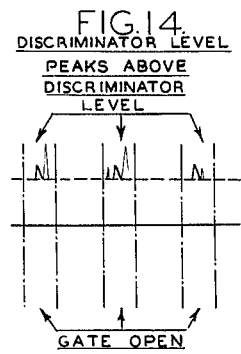
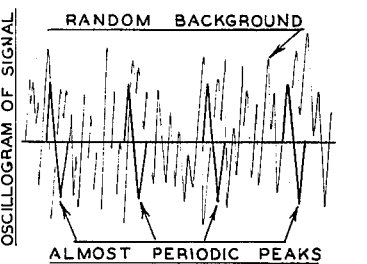
INVENTORS:
TIBOR TALLIAN
JOSEPH A. KAMENSHINE
BY   OLOF G. GUSTAFSSON
Howdon & Howdon
ATTYS.

United States Patent Office 3,208,268
Patented Sept. 28, 1965

3,208,268
DETECTION OF ALMOST PERIODIC
OCCURRENCES
Tibor Tallian, Paoli, Joseph A. Kamenshine, Melrose
Park, and Olof G. Gustafsson, Flourtown, Pa., assignors
to SKF Industries, Inc., Philadelphia, Pa., a corporation
of Delaware
Filed Oct. 5, 1961, Ser. No. 143,182
11 Claims. (Cl. 73—67)

This invention relates to a method of and system for detecting "almost" periodical peaks in a signal, and is particularly useful for the detection of such almost periodical peaks which are present with a noticeable random background. The system will find practical application in the detection of flaws in bearings wherein the flaws are evidence by almost periodical vibration.

This invention is based on a novel concept of time domain analysis of signals for the purpose of detecting localized "almost periodical" occurrences therein contained. "Almost periodic" implies that an occurrence has at least some random variation as to its position within a given cycle but recurs at essentially the cyclic rate. This concept of time domain analysis is used for the purpose of detecting "almost periodical" occurrences, against a random background, in any type of signal amenable to transformation into an electrical signal, provided only that the "almost periodical" occurrences are of relatively short duration, i.e., the "almost periodical" singularity in the signal extends over a relatively small portion of the cycle of repetition.

The standard method of detecting the presence of periodical components in a signal is to use spectrum analyzing equipment consisting essentially of frequency discriminating elements that will respond to signals within a relatively narrow frequency range to the exclusion of any others. If the frequency of the signals to be expected is known beforehand, the spectrum analyzing elements can be limited to tuned "resonators" that transmit signals of the frequency anticipated and exclude all others. If the frequency is not known, scanning type spectrum analyzers of various construction may be used which are so designed as to respond to any frequency within a given range and to indicate, graphically or otherwise, at which frequency a signal of significant amplitude was detected.

Spectrum analyzing equipment is, in general, inapplicable to the detection of occurrences in a signal, which are "almost periodical" as opposed to strictly periodical, that is, occurrences for which the time elapsed between repetitions is equal to a constant plus or minus a finite variation, generally different from zero. If such "almost periodical" signals are submitted to a spectrum analyzer, or to any type of resonator, such analyzer will, in general, fail to respond adequately to the "almost periodical" occurrence. The deviations from true periodicity of these occurrences may be interpreted as varying phase shifts occurring in every cycle, and it is readily seen that resonators will not respond to stimuli, unless the frequency is correct and the phase is constant. This explains why "almost periodical" occurrences will not be properly detected by spectrum analyzing equipment.

It is for almost periodical singularities of short duration, in signals that may have considerable random background, that time domain analysis presents unique advantages. The term "time domain analysis," as opposed to frequency analysis, designates a method utilizing the location of the singularities within particular intervals along the time axis. Time domain analysis lends itself to the detecton of short duration occurrences of "almost periodical" nature, for two reasons. First, if an occurrence is "almost periodic" it will repeat within a relatively short time interval, located one average cycle-time away from the last occurrence. Second, if the occurrence is a singularity of short duration, it can be observed completely within a short time interval and the remainder of the cycle-time will not add anything to its definition. It is possible to distinguish almost periodical occurrences against a relatively heavy random background, utilizing the fact that contributions of the random background occurring at unwanted times, can be eliminated.

More specifically, the present invention concerns a method of analysis of signals for almost periodic vibrations of short duration. This method involves selection of a portion of each cycle of signal repetition substantially less than a full cycle. The vibration pulses within this portion are counted over repeated cycles for a measured period of time. The counts thus obtained are then compared with a standard to determine what portion is attributable to almost periodic vibration.

The system of the present invention employs coupling means for connecting a vibration source to the system to provide a suitable signal. A gate circuit is connected to the coupling means for selectively passing a portion of each cycle of the signal and eliminating the rest of the signal. Counting means is coupled to the output of the gate circuit to count pulses over a selected period of time. Amplification band filtering and other techniques for improvement of the signal may be employed at convenient points in the system and amplitude discrimination is also preferably applied to the signal.

For a better understanding of the present invention, reference is made to the following drawings, in which:

FIGS. 5–11 are time based voltage diagrams indicating the voltage in different parts of the system at corresponding times;

FIG. 12 represents an oscillogram of the signal taken over a number of cycles of a bearing showing vibrational and noise effects;

FIG. 13 illustrates schematically elimination of certain parts of the cycle shown in FIG. 12 by gating means;

FIG. 14 represents an oscillogram similar to FIG. 13 but following the action of the discriminator; and FIG. 15 illustrates the accumulation of counts as a function of time.

Figure 1:
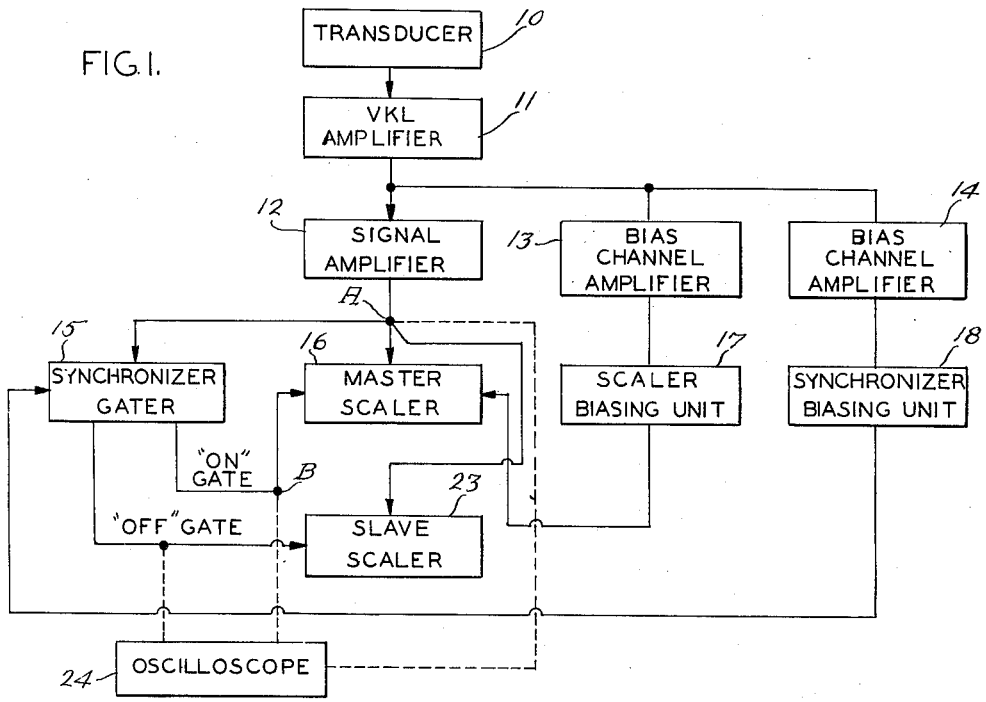
FIG. 1 illustrates a schematic block diagram of the system of the present invention arranged for visual observation.

One example of application of the present invention is the detection of surface flaws in the rolling surfaces of bearing elements which produce an almost periodic vibration. Surface damage on the rolling surfaces of a rolling element bearing will be understood to describe any type of local discontinuity of these surfaces that causes certain localized areas to be of different character from the intended surface finish of the rolling surface. Surface damage may be the result of a great variety of causes, to wit: mechanical injury to the surface by indentation with a hard object, chemical damage by rust, acid etch or other causes, spalling as a consequence of material fatigue after prolonged use, cracking due to excessive stress of any origin, heavy and uneven wear, etc. Many types of surface damage on rolling surfaces are known to be indications of impending bearing failure: e.g., spalling, cracks, and, in most cases, heavy wear. Other types of surface failure, e.g., indentations, heavy scratches, corrosion pits, are not immediate indications of impending bearing failure, but are considered to be conducive to unsatisfactory performance and are, therefore, not acceptable in a rolling bearing.

Evaluation of surface damage as an indication of bearing inferiority is quite prevalent in applications where high reliability or smooth running, or both, are required: such as aircraft, missiles, instrumentation, electrical machinery and others. The manufacturer and user of rolling element bearings go to great lengths in the inspection of the bearing parts and of the assembled bearing to ensure freedom from surface damage.

Heretofore, inspection has been almost exclusively visual and this type of inspection is subject to several shortcomings. It may not be readily performed on the assembled bearing if it is of non-separable construction. It depends on the judgment of the inspector for a decision regarding acceptability of certain surface condition (e.g., minor scratches which exist to some degree on every bearing surface). It is excessively expensive and time-consuming. It is also obviously impractical to be performed in an operational bearing without disassembling the bearing from the machine in which it operates.

It is common practice in the rolling element bearing industry to utilize vibration detecting instrumentation for the purpose of evaluating the smooth running characteristics of bearings as opposed to flaw detection. Known instrumentation will pick up the vibrations emitted by one of the bearing races and evaluate either its effective (R.M.S.) value, its peak value, the number of high peaks produced during a fixed length of time, or a combination of these values. Wave filters may or may not be used to limit the frequency band examined. Although it is not primarily intended for this purpose, if a bearing is afflicted with sufficiently severe surface damage, this commonly used instrumentation will frequently indicate the damage. The indication may result because the surface damage will produce vibration peaks of far larger amplitude than would be found in an undamaged bearing of the same type, make, and grade. Peaks of this type may suffice to produce an unacceptably high effective (R.M.S.) reading, or to yield unacceptable indications on instruments sensitive to peak value or to the number of excessively high peaks produced during a given time. This incidental detection of surface damage is not, however, sufficiently satisfactory to make existing bearing vibration measuring instrumentation acceptable for most purposes of inspection for surface damage on the rolling surfaces of bearings. In fact, it has been repeatedly demonstrated that a bearing may well be afflicted with surface damage of a severity that existing standards of visual inspection would reject, and yet not be detected with frequency sensitive instrumentation.

The nature of surface defects as discontinuities of the surface characteristics implies that a pickup sensitive to any such surface characteristic will detect a signal with at least one "singularity" for each passage of a point of a rolling contact over the damage. In case of a vibration pickup, this will be the case provided that the damage involves a singularity in surface profile, as it almost invariably does. Depending on the nature of the transducer, such "singularities" may be distinguishable as peaks, abrupt changes in slope or other singularities on an oscillographic recording of the signal. If they do not appear directly as peaks, by the use of standard time-integrating or time-differentiating circuitry it is always possible to transform the signal in such a manner as to have the singularities record as one, two, or several "peaks," i.e., local extreme values. The problem of how specifically to achieve this transformation in the case of a particular pickup and pickup circuitry, is beyond the scope of the present invention. It will be assumed that the transformation has been accomplished and the singularities in the signal will, therefore, be referred to as "peaks." The concept, fundamental to this invention, is the recognition that all peaks obtained from a bearing rotating at constant speed, which are due to surface damage, must appear in the signal cyclically because the motion of the bearing elements in rolling contact with each other is essentially periodic in nature. It is, however, a fact that the cyclic nature of said peaks is not necessarily a precise and true longtime periodicity because, for a number of reasons, the motions of the bearing elements are not truly periodical at all times. In particular, the motions of the balls in ball bearings are such that various circumferences are being rolled over successively, each being abandoned more or less gradually, depending on load conditions and other circumstances. This results in an almost periodical effect rather than a precisely periodical effect.

The "almost periodical" character of the peaks due to damage makes possible their distinction from random peaks not originating from surface damage by the use of circuitry capable of responding preferentially to signals that are "almost periodic," (i.e., which occur at nearly equal intervals of time for a significant part of the total observation period) while tending to disregard randomly timed peaks. This discrimination can be enhanced at will by two selective techniques; elimination of all but a selected portion of each cycle and elimination of all signals below a predetermined amplitude. The discriminating power of these techniques permits the construction of damage detecting instrumentation that will reveal surface damage on the rolling surfaces of a bearing, of a much smaller degree than can be detected by known means of vibration testing. It will also substantially improve the discriminating power, i.e., the ability to detect damage, in any other instrumentation for bearing testing within the categories described before.

Referring to FIG. 1, there is shown schematically a system for detecting flaws in bearings. The major components of the system are shown as blocks and it will be understood that the circuitry within the blocks in this and the other figures is of conventional form unless specifically illustrated.

Figure 4:
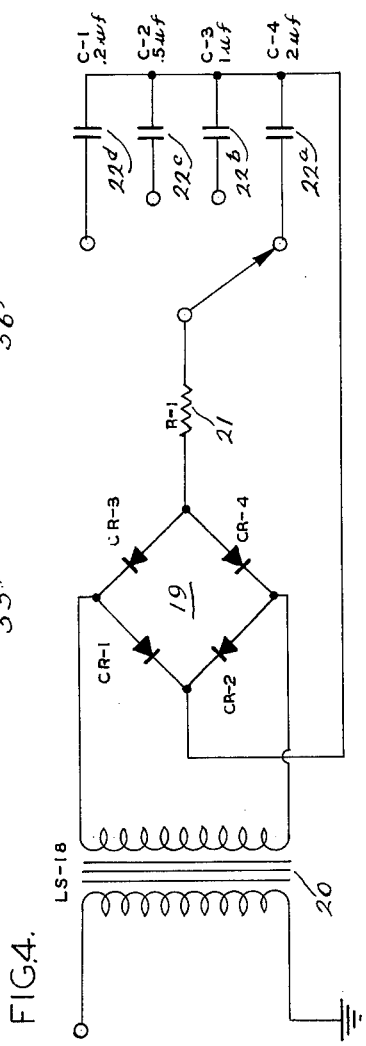
FIG. 4 is a circuit diagram of the biasing unit.

The signal is picked up at transducer 10 which is preferably a velocity sensitive pickup in contact with the test bearing. The signal from transducer 10 is then fed to VKL amplifier 11, a conventional linear voltage amplifier, which, in addition to amplifying the signal received from the transducer, may include a band pass filter to eliminate a major portion of unwanted frequencies in ranges which will not effect the detection of vibrations indicating bearing damage. The signal from the VKL amplifier is fed to signal amplifier 12 and bias channel amplifiers 13 and 14. The signal channel amplifier further is adjusted to provide constant gain as it amplifies the signal from the VKL amplifier before feeding it to the synchronizer gater 15 and the master scaler 16. The bias channel amplifiers 13 and 14 receive the same input from the signal amplifier and are identical in design. The bias channel amplifiers are equipped with manual gain controls, preferably accessible on a control panel with other adjustment means. The manual gain controls enable a variation in amplitude of the output of from one to five times the amplification of the signal amplifier. Each bias amplifier, in turn, supplies its output to the scaler biasing unit 17 and the synchronizer biasing unit 18. The identical biasing units 17 and 18 are preferably of the type shown in FIG. 4. As seen in FIG. 4 a bridge type rectifier 19 preferably employing solid state diodes receives an A.C. input through transformer 20 and feeds its output to load resistor 21 through one of capacitors 22a, 22b, 22c or 22d selectable by suitable switch means. The direct current generated in this way is the arithmetic average of the full-wave rectified output of the bias channel amplifier. Selection of the capacitor has the effect of selecting the time constant of the circuit averaging, for example, from .2 to 2 seconds, over which the signal is taken. If it is too short with respect to the period selected for study, the individual peaks begin to influence the output. If too long, not enough of the effect is considered. The output of the biasing units across the capacitors 22 serves to bias the discriminator in the synchronizing unit and also the common discriminator for the master scaler 16 and slave scaler 23.

The counting means of the system consists of two scalers which are functionally identical to one another. The master scaler 16 includes control circuitry for the counting system and a single discriminator responsive to input signals for both scalers. A single common discriminator is used to insure that both scalers count signals above the same threshold level of discrimination. The slave scaler 23 is equipped with preset count circuitry and provides for imposition of various preset counts selected by a manual element on the control panel. Each of the scalers counts pulses only over a portion of each cycle and is gated to eliminate the count of pulses at other times. The scalers are unable to count until the synchronizer gater 15 renders them conductive. Individual gate signals for each of the scalers 16 and 23 is generated by the synchronizer gater 15. The master scaler 16 receives an "on-gate" signal and thereupon begins registering the number of counts entering the system during its predetermined "on-gate" interval of time (see FIG. 9). The slave scaler 23 is gated by the "off-gate" and counts only during the "off-gate" period (see FIG. 8). The on-gate is arranged to occur at the time that noise generated by a flaw in the bearing is expected as predicted by the prior occurence, whereas the off-gate is timed to occur at some point in time removed from the almost periodic noise burst. Thus, the slave scaler functions to count random noise, which is characteristic of a normal bearing, and occurs statistically the same in all periods. Therefore, a simple difference of the counts of the master and slave scaler for corresponding periods of equal length, for example, gives a statistically accurate indication of the almost periodic noise rate of occurrence over many periods. Both scalers may be reset and started simultaneously with a single instruction. They may both terminate their counting either by a preset count or a preset time command signal. In the preset count mode, instructions relative to the count may be provided by adjustment means on the control panel. In the preset time mode of operation, adjustment means on the control panel limits the amount of time during which counting occurs. An oscillioscope 24 may be used to observe signals occuring at different parts of the circuit to produce oscillograms such as those shown in FIGS. 12, 13 and 14 which will be discussed hereafter.

Figure 2:
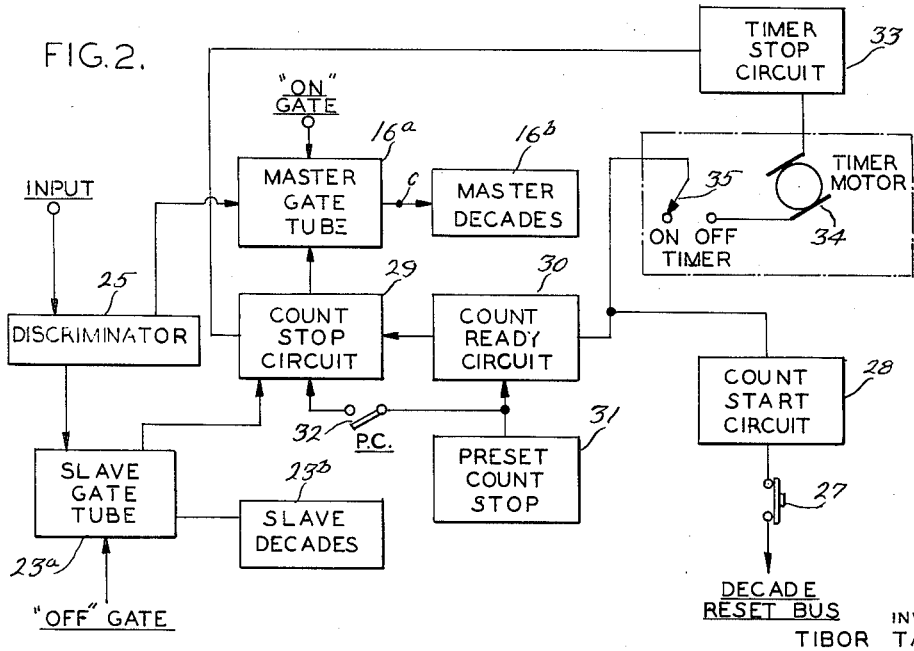
FIG. 2 represents a similar block diagram of the counting system for automatically counting pulses.

Referring to FIG. 2, a system useful for either the preset time or the preset count mode of operation is illustrated. The discriminator 25 previously referred to as part of the scalers 16 and 23 receives the signal and feeds it to the master gate tube 16a and the slave gate tube 23a, respectively. Each of the gate tubes feeds its signal to its respective associated decade 16b or 23b. Whether the gate tube passes a signal to its respective decades depends whether the gate signal is applied. The on-gate signal and the off-gate signal are not coincident but have specific relationship relative to one another as shown in FIGS. 8 and 9. Upon the application of the gate signals, the respective gate tubes 16a and 23a will conduct. As previously explained, the gate signals are staggered as shown in FIGS. 8 and 9 so that these tubes are conducting at different times. When the tube 16a condutcs, pulses are counted by the master decade 16b; when tube 23a conducts, pulses are counted by slave decade 23b. These counts may be combined or may be separately accumulated. Depression of the reset switch 27 momentarily releases the decade reset bus from ground, causing the decades to reset to zero. When the switch 27 is closed again, the count start tube 28 conducts and energizes its associated relay which renders the count stop circuit 29 inoperative as well as changing the state of a binary multivibrator circuit in the count ready circuit 30. The count ready circuit is thereby rendered conducting and energizes a relay which, in turn, causes the count indicator light on the control panel to glow and raises the bias of the gate tubes toward cut-off. The synchronizer gater 15 (see FIG. 1) produces the gating signals which, in effect, raise the respective gate tubes above cut-off and allow the decades to accumulate counts during the gate intervals. When the slave scaler 23a reaches a preset count, a positive pulse from its decade 23b is coupled by way of the preset count stop cathode follower to the count ready multivibrator in the count stop circuit, assuming switch 32 is closed. At this point, the signal from the preset count stop 31 causes the multivibrator in the count ready circuit to change state. This has the effect of deenergizing the associated relay and biasing both gate tubes below cut-off so as to prevent further transmission of input pulses to the decades. The count stop circuit 29 is caused to conduct sending any stop signal to the time stop circuit 33, thereby stopping timer motor 34.

In the preset time mode of operation, the reset button will reset but not start the scaling operation and in order to begin counting, the timer switch 35 must be thrown to the on position. Start and stop signals from the timer are fed to the count ready binary circuit 30 which, in turn, controls the initiation of counting intervals in precisely the same manner as above described for the preset count mode of operation.

Figure 3:
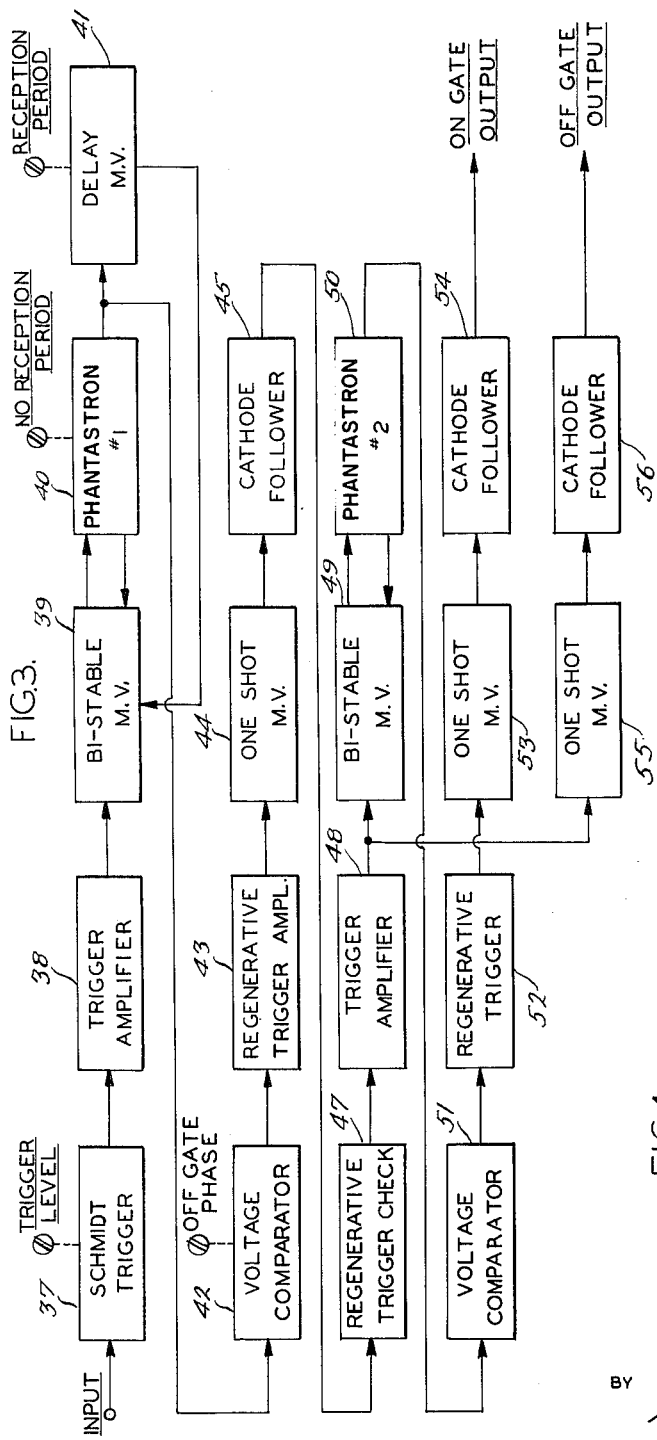
FIG. 3 is a schematic block diagram representing the synchronizer.

The synchronizer gater is illustrated in greater detail in FIG. 3 and its operation will be understood by reference to FIGS. 5–11.

The input to the synchronizer gater from the signal amplifier 12 is received at Schmitt trigger 37, the sensitivity level of which is adjustable so that only signals above a certain amplitude are effective. The signal is amplified by trigger amplifier 38 and fed to multivibrator 39 to change its state. This, in turn, begins the operation of phantastron 40 which in response to the trigger spike shown in FIG. 5 generates a negative going voltage ramp shown in FIG. 6. The phantastron 40 is provided with an adjustment which determines the length of the voltage ramp and, at a predetermined point, the ramp will be discontinued, switching off the multivibrator. The output of the phantastron 40 is fed to a delay multivibrator 41 which feeds back to bistable multivibrator 39. Delay multivibrator produces a trigger at a predetermined voltage to initiate the action of the mutivibrator 39 in the event a pulse is not received from transducer during the reception period. An adjustment of the delay multivibrator, therefore, enables the adjustment of the length of reception period. The phantastron 40 also feeds its voltage output to a voltage comparator which is set so that at a predetermined voltage, a trigger pulse will be generated. Regenerative trigger amplifier 43 amplifies this pulse which is fed to and renders conductive one-shot multivibrator 44 so that its output may be fed through cathode follower 45 to regenerative trigger check 47. This, in turn, feeds trigger amplifier 48 and a system similar to that following trigger amplifier 38, i.e., bistable multivibrator 49 and a second phantastron 50. The phantastron 50 generates a voltage ramp seen in FIG. 7, a comparison of which by voltage comparator 51 produces an output by regenerative trigger 52 which renders conductive for a predetermnied period of time one-shot multivibrator 53. This predetermined period of time is the same time selected for both the on-gate output and the off-gate output, but in this case it is the on-gate shown in FIG. 9 which is generated and fed as seen in FIG. 1 to the master scaler 16 through cathode follower 54. The off-gate is taken from trigger amplifier 48 which actuates one-shot multivibrator 54 having the same period as one-shot multivibrator 55 but which is coupled through the cathode follower 56 to the slave scaler 23 to produce the off-gate shown in FIG. 8.

From the above, it will be apparent to those skilled in the art that the trigger spike from the transducer will initiate the ramp of phantastron 40 shown in FIG. 6 and the phase of phantastron 50 with respect to phantastron 40 will be determined by the voltage comparator 42. The point selected for initiation of the ramp of FIG. 7 is also the point selected for initiation of the off-gate which, because it is generated by a one-shot multivibrator, has a fixed predetermined period. The on-gate relationship is fixed with respect to the off-gate relationship and hence with respect to the trigger spike at some predetermined voltage along the second phantastrom ramp determined by voltage comparator 51. Again, the on-gate period is of the preselected characteristic time period of one-shot multivibrator 53 which is preferably the same period as that of one-shot multivibrator 55 which generates the off-gate. The predetermined end of the ramp of phantastron No. 1 initiates the limits gate which is determined by bistable multivibrator 39, which multivibrator is arranged to be turned off at the end of the phantastron ramp. The bistable multivibrator may then be turned back on either by the next spike received from the pickup as represented by the full line wave form of FIG. 10, or, if no trigger occurs, by trigger generated by the delay multivibrator 41, and fed back to the bistable multivibrator 39 after a predetermined period of time which define the reception limits.

The circuitry described will indicate the presence of peaks in an incoming signal from the transducer. Some of these peaks are due to surface defects and are, accordingly, almost periodic but other peaks are due to noise occurring in a normal bearing. By employing two gates and observing peaks within the reception period wherein almost periodic occurrences arise and peaks that occur during any other time, it is possible to compare the two so that difference in count over a predetermined number of cycles represents a count of almost periodic occurrences. This, of course, requires the proper phasing of the respective gates to include almost periodic peaks and to exclude them in order to give a fair basis of comparison.

The nature of the effect may be seen by reference to FIGS. 12–15. In FIG. 12 the amplified signal at point A in FIG. 1 may be seen as it would appear on oscilloscope 24. The effect of gating is shown in FIG. 13 and that of discrimination following gating in FIG. 14. It will be understood that the gating period as a practical matter in many situations is much narrower and in some situations, such as the one illustrated, must actually be much narrower than can effectively be represented in the drawings. In apparatus shown and described herein discrimination precedes gating. FIG. 13 reprenents the intermediate step in an embodiment in which the reverse is true, i.e., gating precedes discrimination. In accordance with the present invention either sequence may be used. FIG. 14 is representative of the signal at point C in FIG. 2. The count is taken from the peaks not eliminated in FIG. 14 and FIG. 15 diagrammatically illustrates how these peaks are counted in the master decades, for example. The difference between the two counts can be made to be a larger *absolute* number by lengthening the total time of observation and, to a certain limit, by letting the level of discrimination approach zero. The difference can be made to be larger, *relative* to the value of the counts themselves, by reducing the fraction of time during which the gate is open and, to a certain limit, by raising the discriminator level. This latter course of action will, however, if carried too far, cause the reverse effect, and ultimately cause the disappearance of the count difference altogther. Since there is unavoidable random variability in the counts, it is further worth noting that the relative magnitude of the count difference due to the "almost periodic" peaks associated with surface damage, can, at will, be increased over the differences caused by random variation, by lengthening the total time of observation, provided that the synchronization continues to be effective.

It is readily seen from the foregoing that this invention is based on the discrimination between "almost periodical" occurrences and "random" occurrences on the principle that it is possible to make the number of random occurrences, within a periodically repeated time interval, arbitrarily small by reducing the length of that interval; whereas, given synchronization and proper phasing, a fully periodical occurrence will always fall within these intervals, no matter how short they are—and an "almost periodical" occurrence, i.e., one whose frequency deviates no more than a limited small amount from a fixed frequency, will continuously fall within the intervals if, first, the interval is not shorter than a minimum, and, second, by means of synchronization, the beginning of the next time interval is being spaced from the time the last occurrence was observed. Statistically in the situation illustrated where random background peaks are frequently higher than the almost periodic occurrence, operation depends upon making the reception period and the gates sufficiently narrow that the probability that one or more random pulses will fall within the reception period or a gate that narrow is less than one. Under these circumstances, the presence of almost periodic peaks in a segment of the signal will increase the statistical odds of a synchronizing pulse being received by the synchronizer within that signal segment such that the gates will preferentially by synchronized to the almost periodic pulses. Then once one almost periodic pulse is picked up within a gate, the chances that the next will be picked up by the next gate become quite high, due precisely to their almost periodic nature of these pulses.

Even with the first limitation imposed by deviations from periodicity in the occurrences to be observed, it is possible to increase at will the significance of the result of observation, provided that the random background in the signal is stationary. (This is satisfied in all practical cases.) Under these circumstances, the difference between counts including and excluding the "almost periodical" occurrences, respectively, will increase approximately linearly with observation time; whereas random differences will only increase as the square root of observation time, making the non-random count difference progressively larger by comparison.

Higher significance of the results can also be achieved on the basis of the observation that the peaks generated by surface defects are consistently within a relatively narrow amplitude range for any given damaged bearing. Further, their amplitude is often a measure of the "severity" of the damage, provided that the existence of a peak is a measure of damage at all. In the case of damage detection by vibration measurements, peak amplitude is definitely a measure of the severity of damage, inasmuch as smooth running of the bearings is the requirement. Now, in view of this, it is possible to eliminate a percentage of the random peaks from the count by setting the discriminator level at a value other than zero, and more and more random peaks will be eliminated as the level is set higher. It is usually found that the random variation between counts also decreases as the total count is reduced: consequently, the significance of the count difference due to damage increases. At the same time, of course, detection is being limited to damage peaks exceeding the discriminator level.

It is convenient at times to utilize an effective value of the input (such as root-mean-square value taken over a few seconds) to govern the discriminator level. This permits damage peaks to be detected with the same *relative* sensitivity, irrespective of the grade of bearings examined. This may be a legitimate purpose because a damage that is unacceptable in a high grade bearing may be insignificant compared with the overall imperfections of a commercial product. The possibility of eliminating the need for reference specimens, limits of acceptability, etc., may be considered a particular advantage of this procedure.

In utilizing instrumentation of the above described nature, it is, of course, desirable to ensure that all functionally important rolling surfaces be covered by the exploration. In this context, the following, not exhaustive, listing of possibilities inherent in this invention, is offered:

(a) The arrangement covered by this invention may be utilized under various operating conditions provided only that no periodic, external vibrations are introduced. It may be, therefore, practical to operate the bearing under the conditions required in service, leading to the same rolling paths as would prevail in service.

(b) There are operating conditions for each bearing type that expose a maximum of surface to being rolled over. (For balls in a deep groove ball bearing, it is the thrust loaded condition. For rings of the same, it is a certain misaligned condition under thrust load. For cylindrical roller bearings, it is then condition of zero mounted internal looseness, etc.) Such condition may be selected for testing. No reference levels for these unusual conditions are required.

(c) The instrumentation here described may be utilized in conjunction with vibration pickups mounted directly on the machinery in which the bearing to be monitored is in service. If the machinery does not introduce excessive extraneous vibrations, it will be possible to detect bearing damage, as it develops during service. No reference level, difficult to establish in such cases, is required.

An advantage of the instrumentation covered by this invention is that it permits a distinction to be made between surface damages located on the different rolling surfaces of a bearing. The frequency of occurrence of peaks generated by surface damage on the outer ring, the inner ring and the rolling elements (balls or rollers) is characteristically different in most cases and must be monitored separately. There is, of course, no difficulty in their simultaneous monitoring by parallel circuits.

The number used to indicate that two counts, taken in different phases, are of unequal magnitude in a damaged bearing, is not necessarily the difference obtained by subtracting the smaller count from the larger. Any number suitable as an indicator of inequality may be used. Some of the indicators that may be useful are listed as follows:

(a) The algebraic, or absolute difference between two counts taken over the same length of time.

(b) The algebraic or absolute difference between a count taken with the damage peaks included, and the average count of several observation periods of the same length, taken with damage peaks excluded.

(c) The range between the highest and lowest one of several counts taken over the same length of time, over different phases, one of which includes the damage peaks (e.g., a number of phases so selected that the gate openings, taken together, cover the complete cycle time of gate repetition).

(d) The ratio of any of the counts, the difference of which was used in paragraph (a), (b), or (c).

(e) The difference between the maximum count and any mean count such as described in (b) divided through the standard deviation for a population of counts over the same time, not including the damage peaks.

This listing is not exhaustive. Any of the above indicators may be obtained by reading off two or more counts and performing the computation required or by inter-connecting the counters in a suitable manner so that the indicator is directly displayed. One practical method of achieving the latter result is to utilize, as indicator, a number proportional to the ratio between the count including the peaks, and the count excluding same, both taken over the same length of time. Such number is obtainable by the use of a count level discriminator attached to the counter displaying a count with the damage peaks excluded. This discriminator will emit a control signal when the count has reached a preset value. The signal is then used to stop counting on the second counter, displaying a count with the damage peaks included, at the moment when the count level discriminator is actuated.

The count displayed at this time on the second counter is proportional to the ratio sought.

The specifically described system relates to instrumentation utilizing, for the detection of the surface damage, certain characteristics of electrical signals, obtainable, for example, by transducing the vibrations emitted by a rotating bearing with surface damage on its rolling surfaces. It may be applied with equal success to the analysis of airborne sound emitted from a bearing or to that of its running torque, in order to detect the presence of surface damage. It may also be used in any of a number of possible devices that can be utilized to detect the damage on an individual bearing part such as a ring or a ball or roller, provided that the device cyclically scans their surfaces of rotation around one or several of their circumferences and emits electrical signals that are a measure of a surface characteristic that has a discontinuity at the point of surface damage, e.g., light reflection, surface profile, electrical conductivity (in the case of rust), etc. There is no obstacle to the use of this invention for the detection of damage in operational bearings, assembled in running machinery, provided that certain precautions can be observed. In the embodiments described, the comparison of pulses by an "on gate" and an "off gate" during reception and non-reception periods, respectively, allows the speed of the bearing under test to be selected as convenient. Under normal circumstances for a given test, bearing speed is constant. The frequency at which reception periods receive is related to the reciprocal of the period of a contact passage of a rolling member being tested at the test speed recited and this frequency may vary from one bearing to another. The frequencies generated in the apparatus will normally be adjustable to accommodate different bearings.

Other uses for the broadly described invention will occur to those skilled in the art. The method and apparatus described have to be modified in accordance with the use to which it is put. All modifications in method and apparatus within the scope of the claims is intended to be within the scope and spirit of the present invention.

This application is a continuation-in-part of now abandoned United States application Serial No. 852,729, filed November 13, 1959 for "Detection of Almost Periodic Occurrences" by the same inventors.

We claim:

1. A system for analysis of electric signals generated by and representative of vibrations in a vibration source containing "almost periodic" occurrences comprising a transducer for connection with the vibration source to provide a suitable electrical signal including pulses representative of the vibrations, a gate circuit having signal input, gate control and output terminals and connected at its signal input terminal to the output of the transducer, a switch circuit connected between the transducer and the gate control terminal of the gate to produce a gate signal of predetermined duration a predetermined time after receiving a pulse at the output terminal during the last previous gate signal in order to permit the signal representative of vibrations at the input terminal to appear at the output terminal of the gate during the signal of predetermined duration, said signal of predetermined duration being sufficiently narrow that statistically the probability that a pulse would be found within a randomly occurring interval of such predetermined duration is less than one, and means coupled to the output of the gate for counting peaks in said last-mentioned output.

2. The apparatus of claim 1 in which amplitude discriminator means is connected into the circuitry carrying the electrical signal including pulses to eliminate all signals below a predetermined amplitude.

3. The system of claim 2 in which the switch circuit is phase sensitive to almost periodic pulses or similar pulse signals reaching the output terminal of the gate circuit within the predetermined time to cause the gate circuit to pass the portion of the signal most likely to contain almost periodic vibration.

4. The system of claim 3 in which means is connected in the switch circuit to terminate the reception period so that in the event that no pulse occurs during the reception period to terminate the reception period and initiate a non-reception period the means to terminate the reception period will do so in the same manner that a pulse would and thereby determine the maximum length of the reception period.

5. The system of claim 1 in which circuitry providing an on-gate and circuitry providing an off-gate to sample signals in the reception and the non-reception parts of the cycle, respectively, and to count pulses occurring within the respective samples constitute part of the circuit switch.

6. The system of claim 5 in which means for comparing the relative counts of the two counters is provided.

7. The system of claim 6 in which timer means is provided together with apparatus which limits counts measured to a pre-set time.

8. The system of claim 6 in which means is provided to limit the counts collected in one counter to a predetermined number of counts, and means is provided to terminate counting in both counters thereafter.

9. The apparatus of claim 2 in which means is provided in the switch circuit to vary the predetermined time within which pulse signals may reach the output terminal.

10. The system of claim 2 in which means is provided in the switch circuit to vary the predetermined time after receiving a pulse before another predetermined period of the signal is to be examined.

11. The system of claim 2 in which means is provided whereby the amplitude discriminator means may be adjusted to discriminate at selected amplitudes.

References Cited by the Examiner

UNITED STATES PATENTS

| | | | |
|---|---|---|---|
| 2,174,176 | 9/39 | Journeaux et al. | 73—69 X |
| 2,996,912 | 8/61 | Shailor | 73—71.4 |
| 3,012,434 | 12/61 | Wehof | 73—71.4 |
| 3,051,897 | 8/62 | Peterson et al. | 324—77 |

RICHARD C. QUEISSER, *Primary Examiner.*

UNITED STATES PATENT OFFICE
CERTIFICATE OF CORRECTION

Patent No. 3,208,268                                    September 28, 1965

Tibor Tallian et al.

It is hereby certified that error appears in the above numbered patent requiring correction and that the said Letters Patent should read as corrected below.

Column 1, line 17, for "evidence" read -- evidenced --; column 3, line 16, for "condition" read -- conditions --; column 7, line 8, for "phantastrom" read -- phantastron --; line 48, for "reprenents" read -- represents --; column 9, line 14, for "then" read -- the --; line 15, for "condition" read -- conditions --; column 11, line 15, for "circuit switch" read -- switch circuit --.

Signed and sealed this 17th day of May 1966.

(SEAL)
Attest:

ERNEST W. SWIDER
Attesting Officer

EDWARD J. BRENNER
Commissioner of Patents